(12) United States Patent
Pryor et al.

(10) Patent No.: US 8,740,541 B2
(45) Date of Patent: Jun. 3, 2014

(54) METHOD AND APPARATUS FOR A CARD DISPENSER

(75) Inventors: Glen Pryor, Manhattan, IL (US); Wayne Webster, Wilmington, IL (US); Scott A. Lindee, Mokena, IL (US); Ryan Torrenga, Bourbonnais, IL (US); Paul Choate, Colorado Springs, CO (US)

(73) Assignee: Formax, Inc., Mokena, IL (US)

(*) Notice: Subject to any disclaimer, the term of this patent is extended or adjusted under 35 U.S.C. 154(b) by 0 days.

(21) Appl. No.: 13/504,036

(22) PCT Filed: Oct. 26, 2010

(86) PCT No.: PCT/US2010/054156
§ 371 (c)(1),
(2), (4) Date: Apr. 25, 2012

(87) PCT Pub. No.: WO2011/056603
PCT Pub. Date: May 12, 2011

(65) Prior Publication Data
US 2012/0207578 A1 Aug. 16, 2012

Related U.S. Application Data

(60) Provisional application No. 61/255,087, filed on Oct. 26, 2009, provisional application No. 61/255,445, filed on Oct. 27, 2009.

(51) Int. Cl.
*B65H 3/00* (2006.01)
*A22C 17/10* (2006.01)
*B65B 25/06* (2006.01)
*B65B 57/00* (2006.01)
*B65B 43/18* (2006.01)
*B65B 59/00* (2006.01)

(52) U.S. Cl.
CPC .............. *B65B 25/06* (2013.01); *A22C 17/10* (2013.01); *B65B 57/00* (2013.01); *B65B 43/18* (2013.01); *B65B 59/00* (2013.01); *Y10S 53/01* (2013.01)
USPC ............... 414/797.8; 414/795.4; 414/797; 53/DIG. 1

(58) Field of Classification Search
USPC .............. 414/797.8, 795.4, 797, 797.3, 797.6
See application file for complete search history.

(56) References Cited

U.S. PATENT DOCUMENTS 2,304,146 A * 12/1942 Brinton ........................ 53/167
2,907,152 A 10/1959 Hensgen
(Continued)

OTHER PUBLICATIONS

Notification of Transmittal of International Search Report & Written Opinion Mar. 14, 2011.

*Primary Examiner* — Gregory Adams
*Assistant Examiner* — Lynn Schwenning
(74) *Attorney, Agent, or Firm* — Klintworth & Rozenblat IP LLC

(57) ABSTRACT

A card dispensing system for dispensing cards along a conveying surface which conveys sliced products downstream of a slicer for packaging the sliced products. A hopper contains a stack of cards which are withdrawn from the hopper by a suction force provided via at least one suction cup. The suction cup is moveable vertically to retrieve and remove the card from the hopper. The suction cup is moveable laterally to move the card into a receiving position where a card clamp on a damp carriage arrives to receive the card. Suction force on the card is released when the card damp damps down on the card. The clamp carriage moves the card from the receiving position to the staging position where a nip engages with the card to feed the card through a junction in the conveyor line just as a food product passes over the junction.

19 Claims, 15 Drawing Sheets

(56) References Cited

U.S. PATENT DOCUMENTS

| | | | |
|---|---|---|---|
| 3,105,337 A | 10/1963 | Clanin et al. | |
| 3,155,244 A * | 11/1964 | Rogers et al. | 414/796.1 |
| 3,815,319 A | 6/1974 | Vedvik | |
| 3,947,017 A * | 3/1976 | Seragnoli | 271/99 |
| 4,328,657 A | 5/1982 | Brandmaier | |
| 4,452,031 A | 6/1984 | Dennis | |
| 4,728,092 A | 3/1988 | Selak | |
| 4,894,976 A | 1/1990 | Wallace et al. | |
| 5,253,857 A * | 10/1993 | Ballestrazzi et al. | 271/91 |
| 5,443,150 A | 8/1995 | Buchko | |
| 6,263,640 B1 | 7/2001 | Handel | |
| 6,474,635 B2 * | 11/2002 | Ruf et al. | 271/12 |
| 6,997,089 B2 | 2/2006 | Lindee | |
| 7,172,116 B2 | 2/2007 | Yamamiya | |
| 2008/0011832 A1 | 1/2008 | Chang | |

* cited by examiner

METHOD AND APPARATUS FOR A CARD DISPENSER

This application is a nationalization of PCT application PCT/US2010/054156 filed on Oct. 26, 2010, and claims the benefit of U.S. Provisional Patent Application 61/255,087 filed Oct. 26, 2009 and U.S. Provisional Patent Application 61/255,445 filed Oct. 27, 2009.

FIELD OF THE INVENTION

This invention relates in general to food packaging systems, and methods of dispensing cards, in particular, for packaging stacked slices of food products.

BACKGROUND OF THE INVENTION

Sliced and shingled food products such as bacon is often placed on a cardboard sheet and inserted into airtight packaging. The cardboard sheet often provides information about the product, such as weight, nutritional information, and grade. In the past, segregated groups of slices were placed on the cardboard sheet manually by attendants located along a packaging and manufacturing line. This is often time consuming and lacking in economic efficiency.

Most bacon lines today are equipped with an automatic cardboard sheet dispenser, such as the dispensing systems disclosed in U.S. Pat. Nos. 4,328,657 and 4,452,031. Cardboard sheet dispensers are incorporated in bacon or other food product slicing machine lines that are used to group slices in shingled, segregated batches of predetermined weight. The dispensing system dispenses a cardboard sheet onto a conveying surface, such as a conveyor belt, in synchronization with the movement of batches along the conveying surface, so that the movement of the individual batches along the conveyor belt is used to dispose the batches onto the dispensing sheet of cardboard. The batches of sliced product disposed onto a cardboard sheet are transferred further downstream for additional packaging and other processes.

U.S. Pat. No. 4,452,031 discloses a card dispenser including a hopper for receiving vertically stacked cardboard sheets and a base having a plurality of strippers to support the stack of sheets while assuring that only one sheet at a time is removed from the hopper. U.S. Pat. No. 4,328,657 discloses a card dispenser including a hopper for receiving vertically stacked cardboard sheets with a plurality of restrainers in supporting the stack of sheets and to fan the sheets to minimize sticking of the sheets to one another. A pick off assembly that removes the lower most sheet from the hopper and transfers it to the nip of a roller assembly is disclosed in both patents. The pick off assembly includes two piston cylinder arrangements which allows the first piston cylinder assembly to actuate between a vertical upright position and an inclined position where the sheet is picked up by a roller assembly. The roller assembly directs the cardboard sheet so it is moved by a pusher assembly to a location where the cardboard receives a batch of slices.

The present inventors have recognized that the known prior art card dispensing devices described, and others, have been disadvantageous for various reasons. Prior art dispensing systems lack the capacity to dispense and package sliced products at higher volumes. Prior art dispensing systems also lack the ability to adapt packaging process to accommodate different cards for various grades of meat product being packaged along the same processing line.

SUMMARY OF THE INVENTION

The present invention provides a method and apparatus for dispensing cards for packaging predetermined quantities of sliced products. Presliced drafts are placed on an infeed conveyor where it passes under a product sensor station. A product sensor detects the sliced product, serves as a marker, and tracks the precise position of the draft along the conveying surface for proper card placement downstream. As the draft approaches the card assembly station dispensing the applicable card, a card is drawn from the bottom of a hopper via suction cups positioned at the bottom of the hopper. A clamp, connected to a clamp carriage, moves towards the awaiting card being held by the suction cups to the receiving position, where the clamp grasps the card, simultaneously triggering release of the suction. The clamp carriage will move the card into a staging position beneath the infeed conveyor, and position the leading edges of the card in a card nip roller area to await a signal. Upon the signal, which activates the dispensing mechanism and simultaneously signals the release of the card clamp, the card nip will close, pinching the card between a nip drive roller and an idle roller to roll the card into position directly beneath the oncoming product.

In another aspect, the present invention provides a method and apparatus for dispensing cards corresponding to different grades of sliced products along a conveying surface, thus allowing a more efficient method of packaging differently graded drafts. As the sliced drafts enter the product sensor station, the product sensor detects the sliced product on the infeed conveyor and signals a camera that the product is entering the photo area. The camera captures a digital image of the draft. Grading software is used to determine the grade of the draft by analyzing the image captured. Card assembly stations situated along the conveying surface each comprise a hopper containing cards with a particular grade label. Once the grading software determines the grade of the draft, a signal is sent to the card assembly station with the card corresponding to the appropriate grade level to activate the dispensing mechanism, such that a card displaying the proper grade information for the draft is dispensed as the draft moves along the conveying surface. Other card assembly stations with card corresponding to a grade level inapplicable to the draft passing by on the conveying surface remain dormant as the draft passes.

Numerous other advantages and features of the present invention will be become readily apparent from the following detailed description of the invention and the embodiments thereof, from the claims and from the accompanying drawings.

DETAILED DESCRIPTION OF THE PREFERRED EMBODIMENTS

Figure 1:
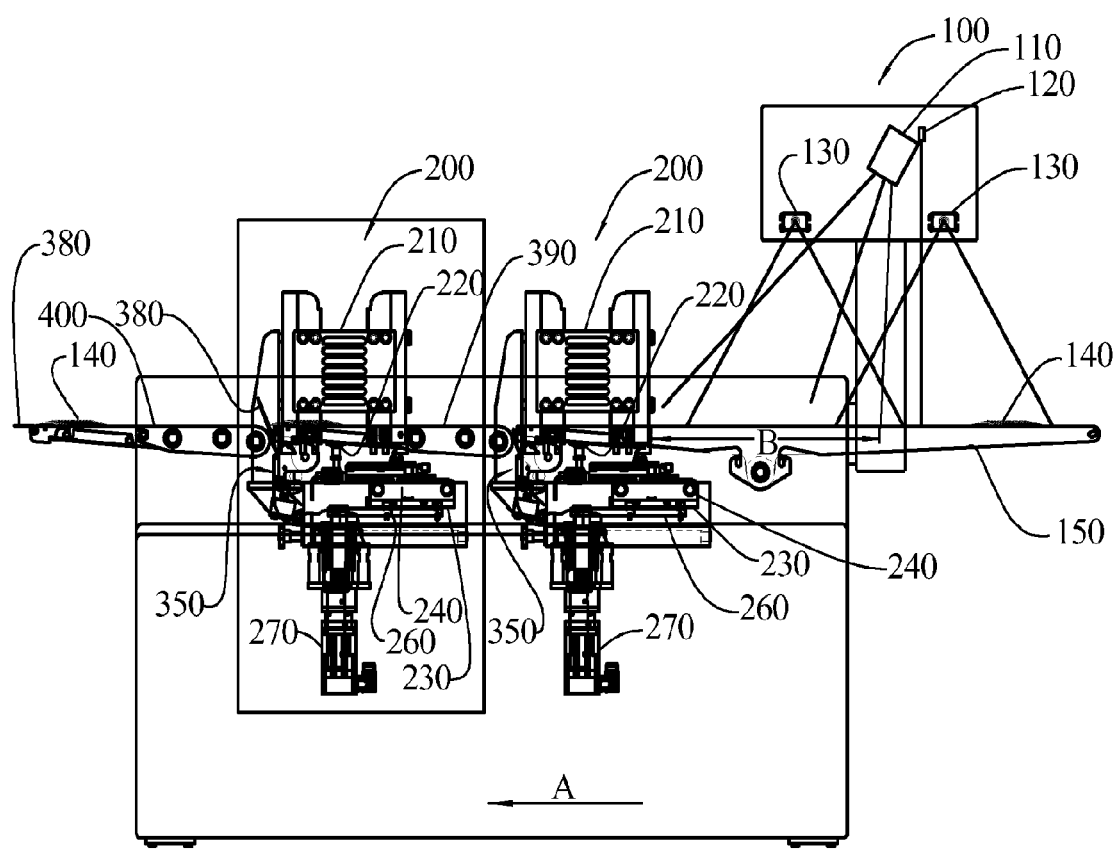
FIG. 1 is a schematic side view of the product processing line.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates the primary components of the card dispensing system. The card dispensing system comprises a product grading station 100, an infeed conveyor 150, an intermediate conveyor 390, an exit conveyor 400 and two card assembly stations 200 which are situated along the product line. The various components of the invention will now be discussed in detail.

As illustrated in FIG. 1, the product grading station 100 is situated above, and near the beginning of the infeed conveyor, whereby products are conveyed in a direction "A." The product grading station comprises a camera 110, a product optical sensor 120 and lights 130. The product sensor 120 senses incoming drafts 140 and signals to the camera 110 that a product is entering the photo area, indicated as "B" in FIG. 1. Lights 130 provide sufficient illumination for capturing a digital image of the draft. The digital image is transferred to vision system software, such as the one described in U.S. Pat. No. 6,997,089, which analyzes the image captured and compares relative fat areas and lean areas to determine a fat to lean ratio for grading purposes. Upon determination of the grade of a particular draft, information is sent to the appropriate card assembly station 200 with the card containing grade information corresponding to the grade of the draft.

FIG. 1 shows two card assembly stations 200 situated along the conveying line. Each card assembly station corresponds to a dispensing of different cards, for example, grade 1 or grade 2 cards. Each card assembly station dispenses cards at the junction between adjacent conveyor belts. FIG. 1 illustrates a card 380 being dispensed between the intermediate conveyor 390 and the exit conveyor 400.

The conveying line shown in FIG. 1 comprises of an infeed conveyor 150, an intermediate conveyor 390, and an exit conveyor 400. A person having skill in the art given the present disclosure will recognize that additional intermediate conveyors and card assembly stations can be incorporated into the conveying line so as to allow for packaging of additional grades of sliced product.

Figure 2:
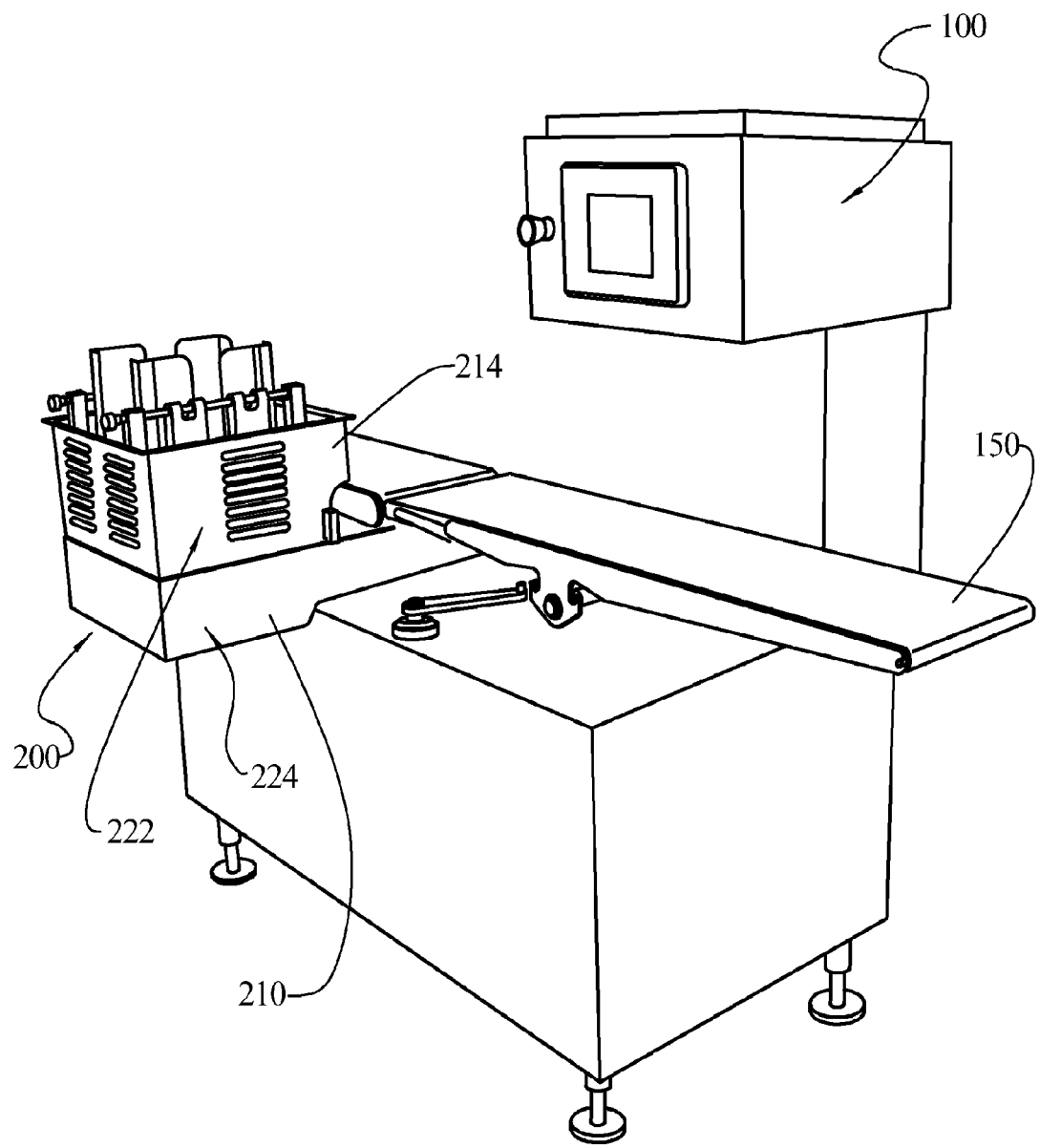
FIG. 2 is a perspective view of the processing line with a card assembly station.
Figure 3:
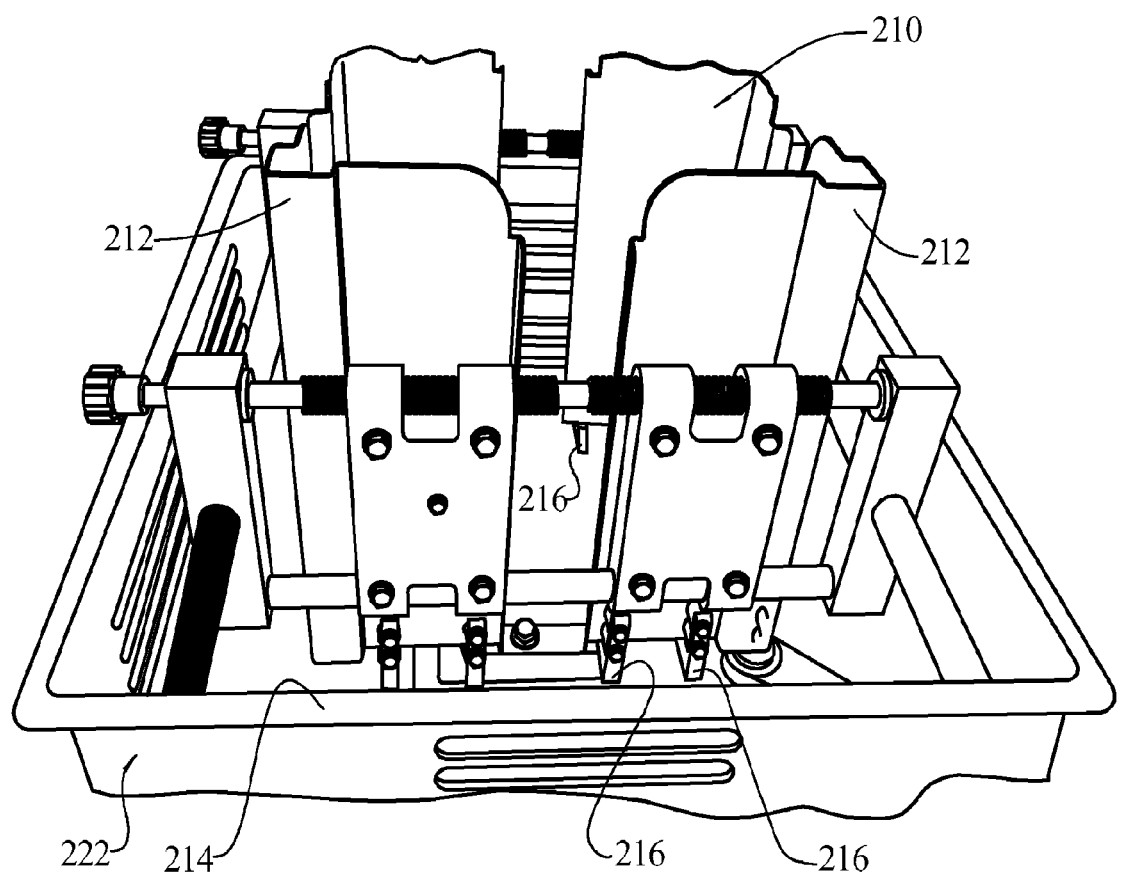
FIG. 3 is a perspective view of the side of the hopper.

FIG. 2 illustrates a card assembly station situated adjacent to the product line. As seen in FIG. 2, the card assembly station comprises a top portion 222 and a bottom portion 224. The top portion 222, as illustrated in FIG. 3, comprises a hopper 210 surrounded by a hopper guard 214. The hopper guard 214 encloses at least a portion of the hopper 210, and provides support for the hopper. The hopper is defined by four corner panels 212 arranged in accordance with the dimensions of the cards being dispensed from the hopper 210. Support fingers 216 at the bottom of the hopper releasably hold and support the cards until they are ready to be removed from the hopper 210.

Figure 4:
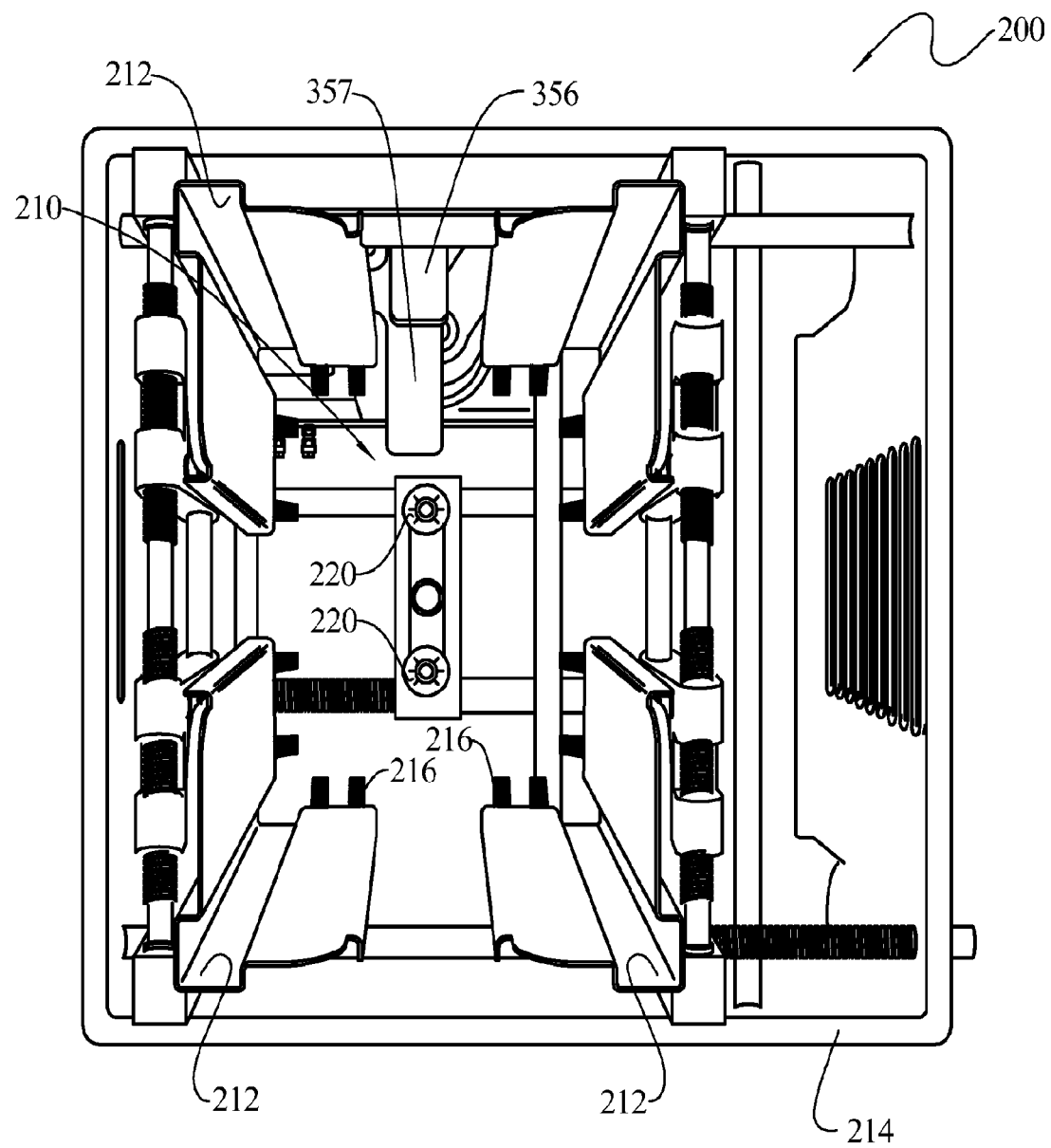
FIG. 4 is a top view of the hopper.

Cards are removed from the hopper 210 through the use of suction cups 220 situated below the hopper 210. FIG. 4 illustrates a top view of an empty hopper 210, with suction cups 220 situated below.

Figure 5:
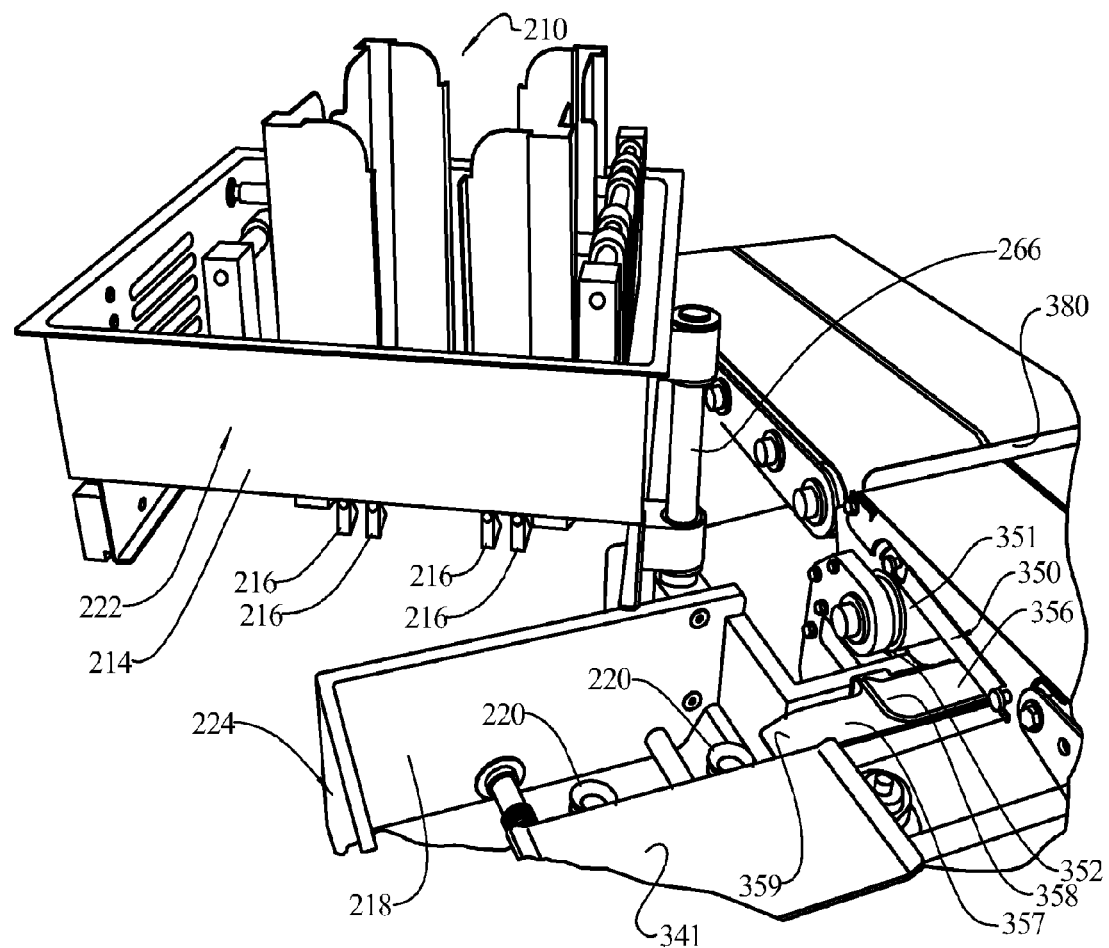
FIG. 5 is a perspective view of the card assembly station with the top and bottom portions of the card assembly station separated.

FIG. 5 illustrates the separation of the top portion 222 of the card assembly station from the bottom portion 224 of the card assembly station. The top portion 222 is pivotally attached to a shaft 226, allowing the top portion to pivot away from the conveying surface, and away from bottom portion 224. When the top portion 222 and bottom portion 224 are in alignment, as shown in FIGS. 2 and 4, the hopper guard 214 and bottom enclosure 218 forms a substantially continuous skirt which houses the hopper 210 and the suction cups 220. Pivoting the top portion 222 away from the bottom portion 224 allows the bottom portion, which is enclosed on the sides by bottom enclosure 218, to be accessible from above, as illustrated in FIG. 5.

Figure 6:
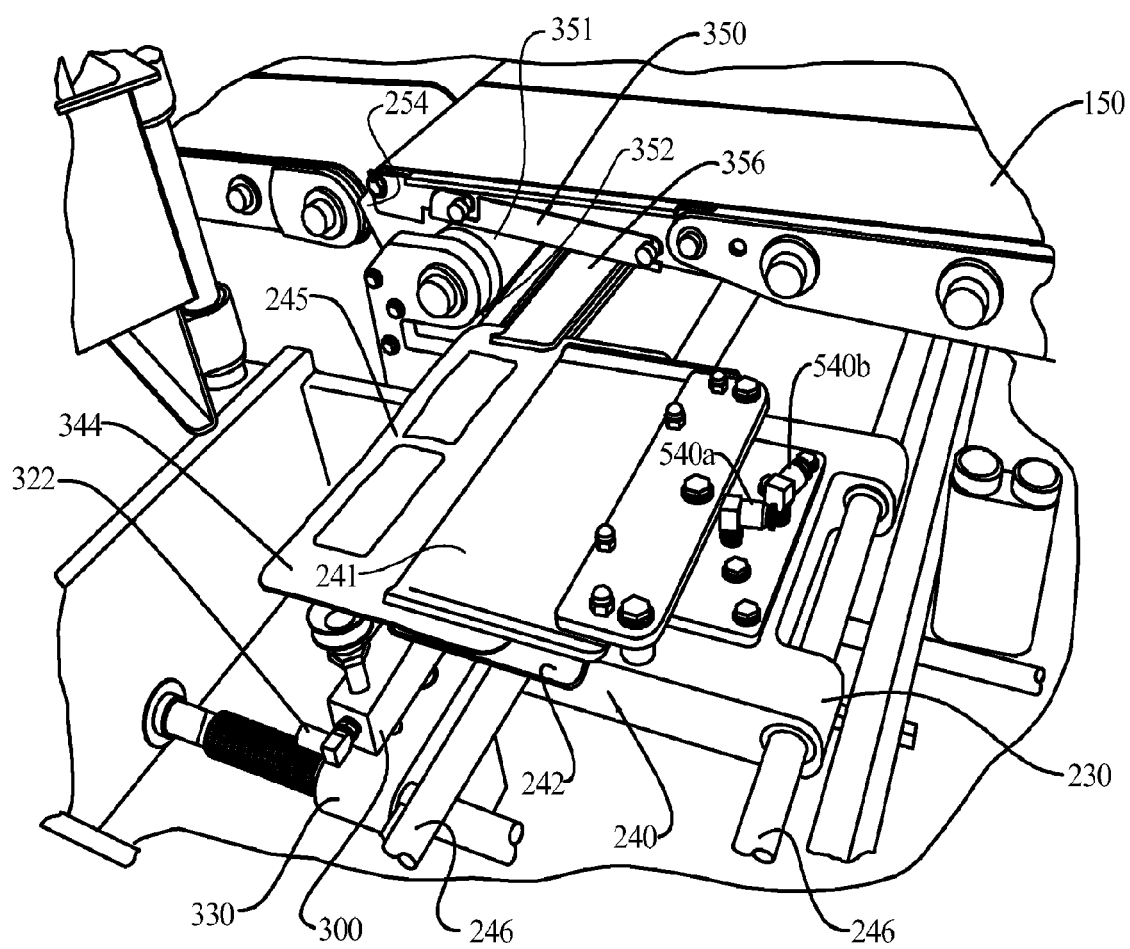
FIG. 6 is a perspective view of the card clamp and card nip.
Figure 7:
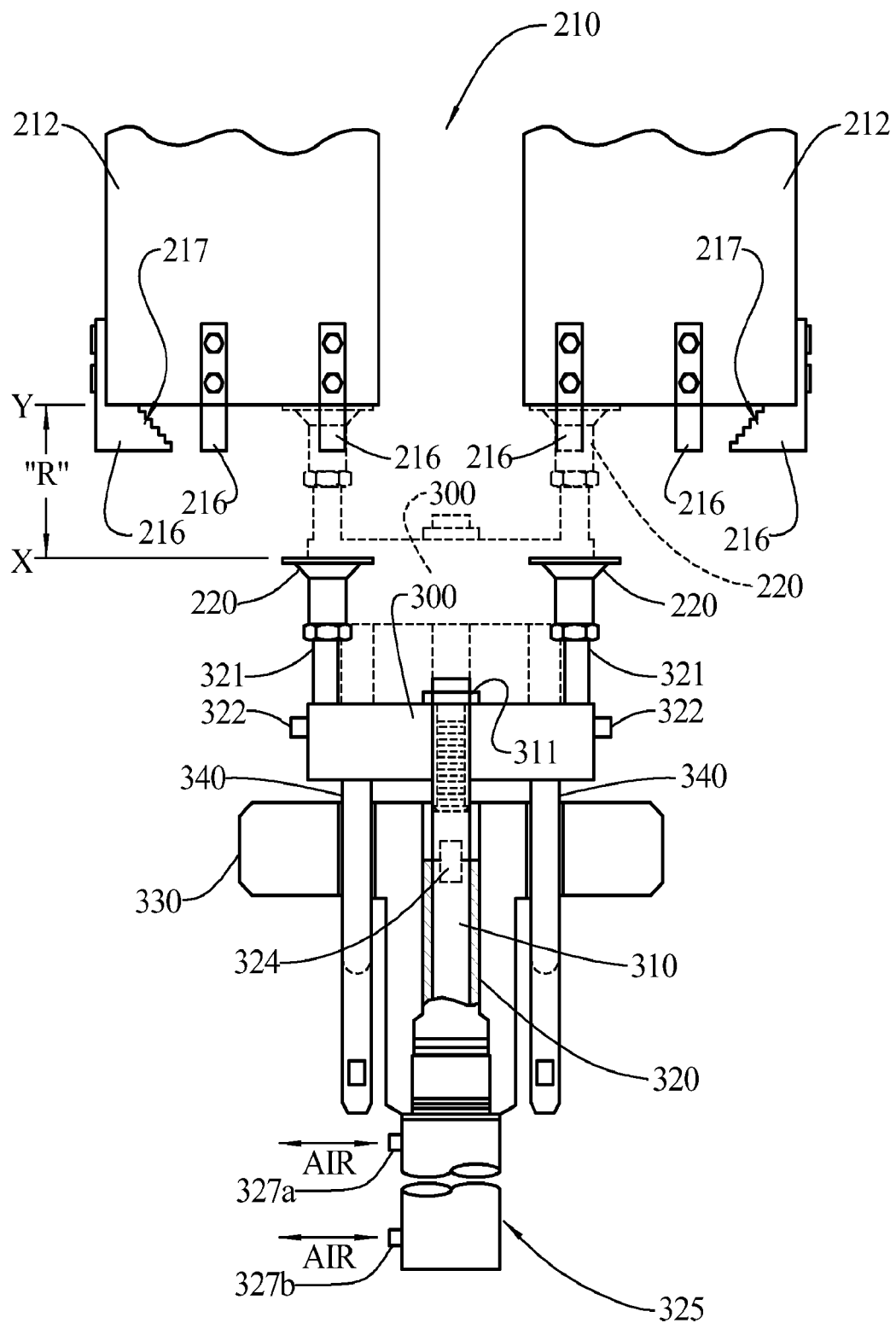
FIG. 7 is a schematic diagram of the suction cups.

The suction cups 220 are situated within the bottom portion 224 of the card assembly station, as illustrated in FIG. 6. FIG. 7 illustrates the suction cups connected to a rigid horizontal block 300. The suction cups are raised and lowered according to the upward and downward motion of the rigid horizontal block 300. The suction cups are raised from their resting height "X" a distance "R" to a height "Y," allowing the suction cups 220 to come into contact with the bottom card (not shown) in the hopper 210. The suction cups 220 exert a negative pressure in order to attach the bottom card. The bottom card is removed from the hopper by lowering the suction cups 220. The removal of the card from the hopper is facilitated by the support fingers 216, which comprise an inclined surface comprising a series of gradual ridges 217 along the side in contact with the card (FIG. 7). This gradual stepping down of the inclined ridges 217 works in conjunction with the flexible nature of the cards to allow the edges to decrease its bending as the card is gradually pulled in a downward direction from the hopper along the support fingers 216.

As illustrated in FIG. 7, the horizontal block 300 is attached to a central rod 310 by a fastener 311. Two guiding rods 340 are fixed to the block 300 on either side of the central rod 310. The raising and lowering of the horizontal block 300 is achieved by the upward and downward movement of the central rod 310 telescopically within a central tube 320. The central tube is situated within a T-shaped base member 330. The base-member 330 also comprises two channels within each of the arms of the T-shape, which extend through the entire depth of the arms. The guiding rods 340 are fitted through the channels, and move vertically with the movement of the horizontal block 300. The guiding rods 340 assist in keeping the horizontal block 300 from inadvertently pivoting around the central rod 310, and ensure that the movement of the horizontal block 300 is even within the same vertical plane. The central rod is connected at its base 324 to a double acting air cylinder 325, the top portion of which is nested within the bottom 326 of the T-shaped base member 330. The dual acting pneumatic cylinder comprises two air ports 327a, 327b which can alternately act as pressure air in or air bleed out, to actuate the upwards and downward motion of the central rod, and correspondingly the horizontal support block 300 on which the suction cups are attached.

Each suction cup 220 is connected to a stem 321, which extends upward from the horizontal block 300. The stem 321 and the suction cup 220 are connected to form a central channel through which a negative pressure can be applied to create a vacuum. L shaped air channels 322 (FIGS. 6 and 7) are situated on either side of the horizontal block 300 to allow for a negative air pressure flow generated by an external source, to flow through the suction cups 220 and stems 321 and through a channel formed within the block 300.

Once the suction cups 220 have removed a card 344 from the hopper 210 by attaching to the card and lowering the card, the card is lowered until the suction cups 220 are in their resting position "X," as illustrated in FIG. 7. When the suction cups 220 pull a card down, a portion of the edge of the card closest to the conveying surface rests on a bottom guiding strip 357, illustrated in FIGS. 4 and 5, which helps guide the lateral movement of the card between a top guiding strip 356 and the bottom guiding strip 357 as the card is moved to a staging position beneath the conveying surface. Both the top guiding strip 356 and the bottom guiding strip 357 have curved lips 358, 359 at the edge first coming in contact with the card to facilitate reception of the card, as illustrated in FIG. 5.

The suction cups 220 continue to hold the card in place until a card clamp 240 moves laterally along clamp carriage guide arms 246 from its card staging position beneath the conveying surface, towards the "receiving position," where an awaiting card is held by the suction cups 220. When the card clamp 240 reaches the awaiting card, the card clamp, comprising a top plate 241 and a bottom plate 242 as illustrated in FIG. 6, will close on a central portion of the awaiting card, simultaneously triggering the release of the card by the suction cups.

As shown in FIGS. 1 and 6, the card clamp is mounted on a clamp carriage 230 which moves bi-directionally along clamp carriage guide rods 246. The clamp carriage 230 is preferably composed of plastic. As the card clamp 240 moves laterally along clamp carriage guide rods 246 to the staging position beneath the conveying surface 150 at a card nip roller area 350, a portion of the card becomes increasingly engaged between the guiding strips 356, 357. FIG. 6 illustrates a card clamp 240 which has just begun to move the card along the clamp carriage guide rods 246 towards the staging direction. A portion of the card 344 slides under the top guiding strip 356. The guiding strips 356, 357 help maintain the leading edge of the card 245 in alignment with the card nip roller area 350.

Figure 12:
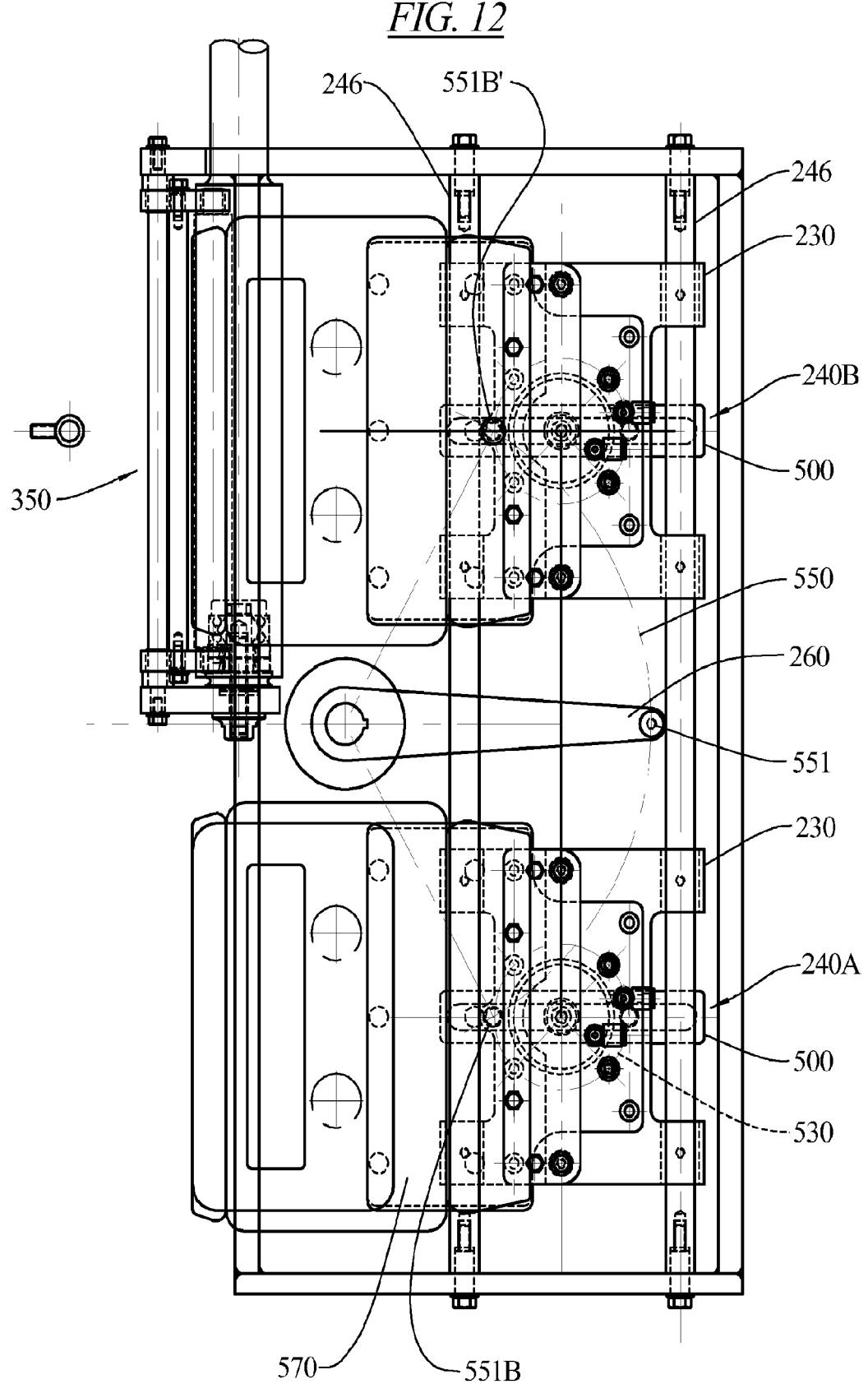
FIG. 12 is a top view of the card clamp in its receiving and staging positions.
Figure 13:
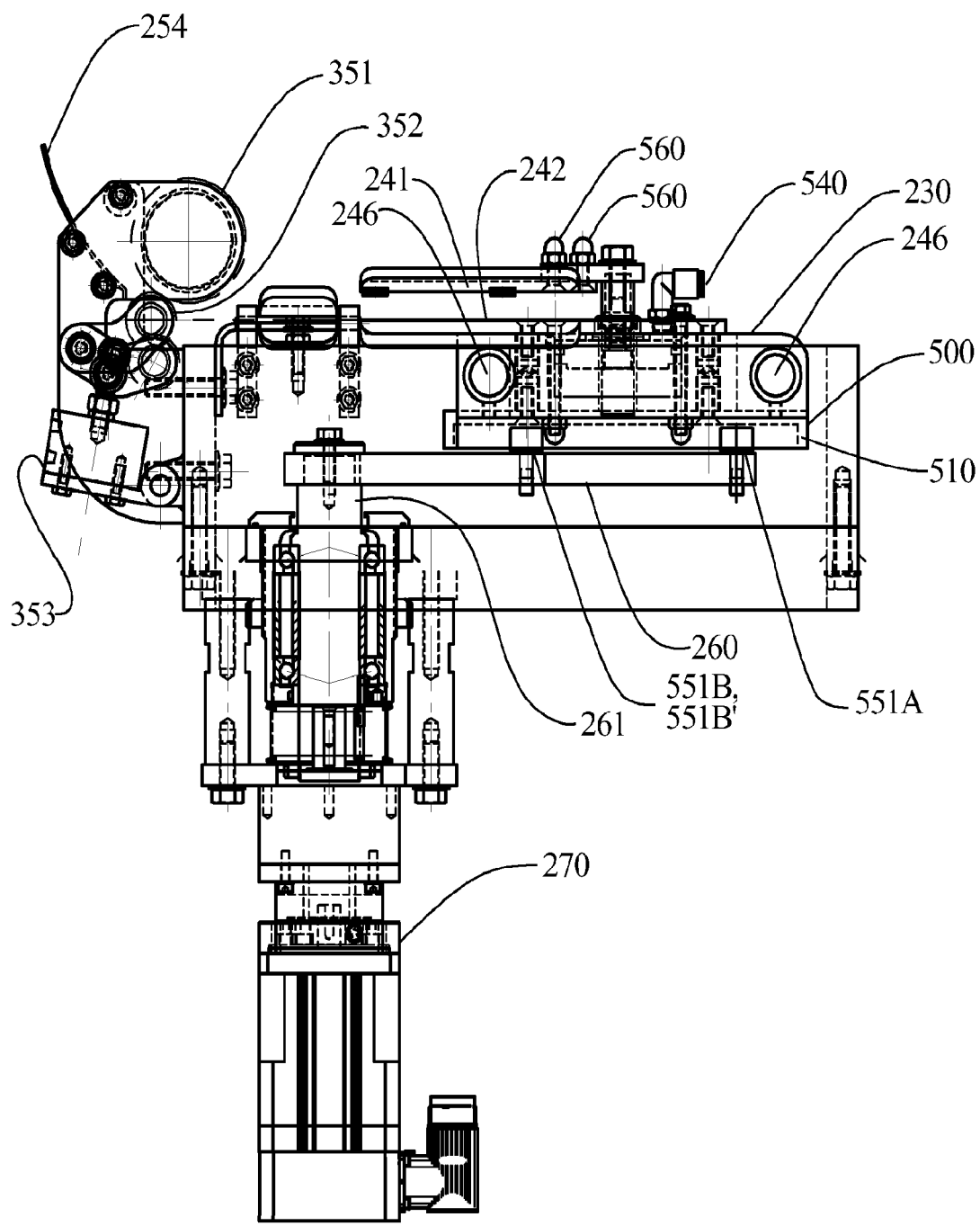
FIG. 13 is a side view of the clamp carriage and card clamp.
Figure 14:
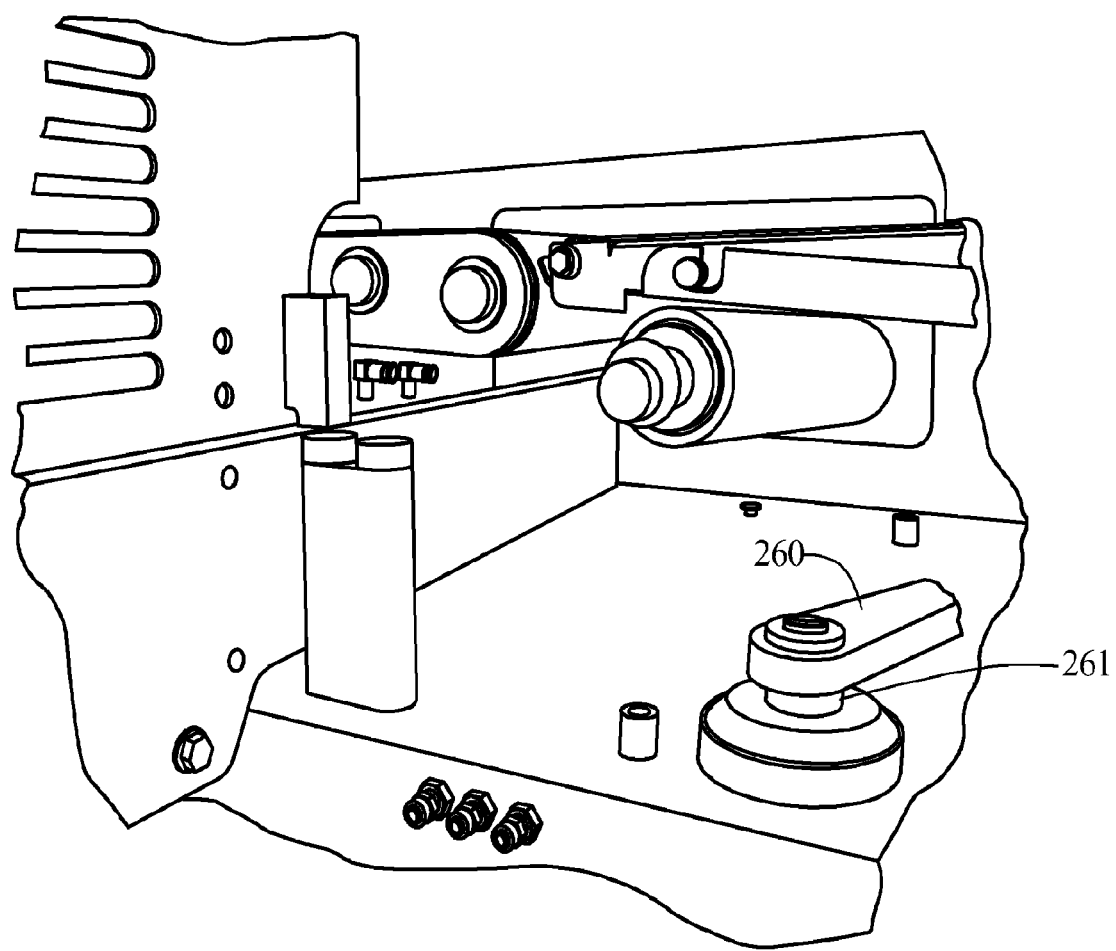
FIG. 14 is a perspective view of the staging area with parts removed for clarity.

For illustration purposes, FIG. 12 shows the card clamp 240 in both the receiving position 240A and the staging position 240B. A clamp carriage drive motor 270 (FIG. 13) rotates the clamp carriage drive arm 260 to move the clamp carriage 230 laterally along the clamp carriage guide rods 246 between the receiving position and the staging position (FIG. 12). The clamp carriage drive arm 260 pivots about a shaft 261, as illustrated in FIGS. 14 and 13. The clamp carriage drive arm 260 pivots along an arc 550 which moves the clamp carriage along the clamp carriage guide rods 246 (FIG. 12).

Figure 15A:
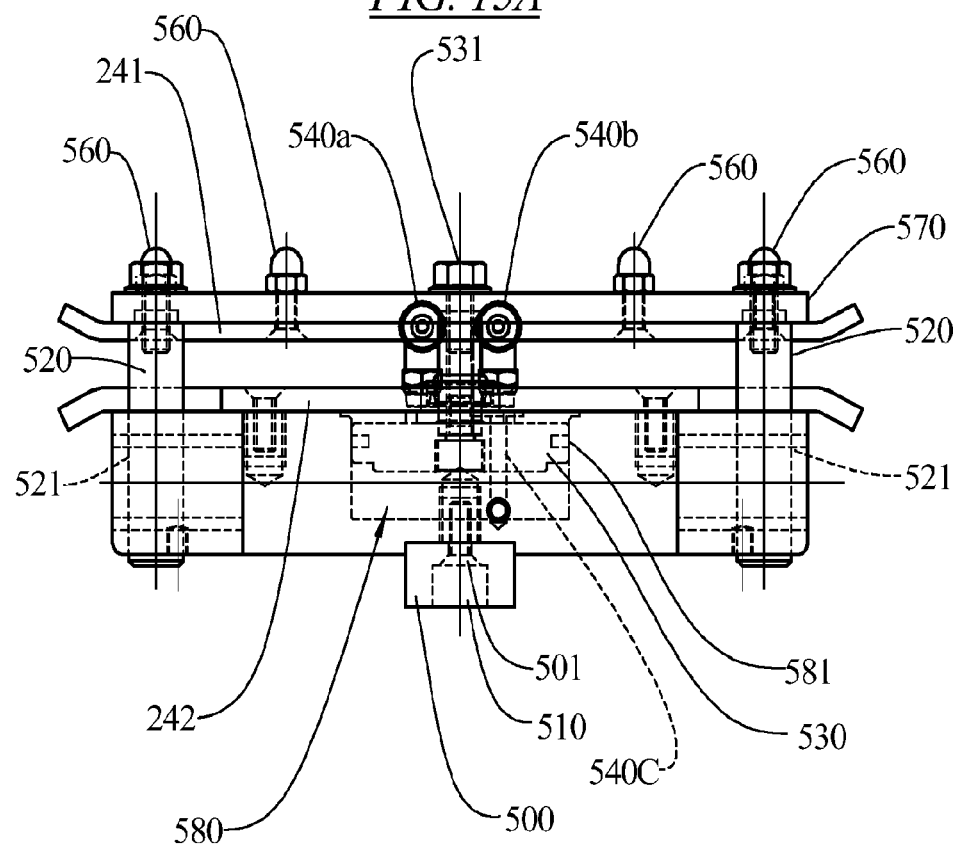
FIG. 15A is view of the card clamp and clamp carriage in the longitudinal direction of travel.
Figure 15B:
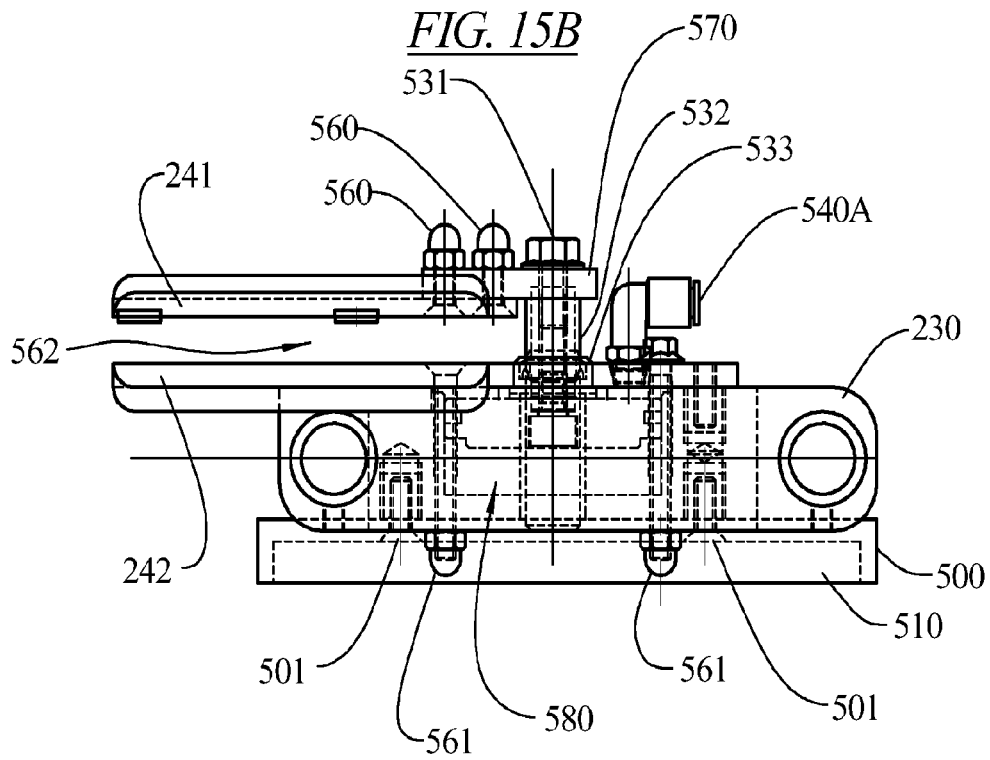
FIG. 15 B is a side view of the card clamp and clamp carriage.

The pivotal motion of the clamp carriage drive arm 260 is transferred into a lateral movement through the use of a carriage bar 500 attached to the bottom of the clamp carriage 230, as shown in FIGS. 6, 12, and 13. The carriage bar 500 is attached to the clamp carriage 230 using screws 501 as illustrated in FIGS. 15A and 15B. The carriage bar 500 comprises a groove 510 on the underside. The clamp carriage drive arm 260 comprises a pin 551 on the end of the arm. The pin 551 is of a size suitable for fitting into the groove 510, and slideably engaging with the groove. When the clamp carriage drive arm 260 moves along an arc 550, the pin 551 slides along the groove 510 in various positions. When the clamp carriage drive arm is in a position perpendicular to the clamp carriage guide arms 246, as shown in FIG. 12, the pin 551 is a the position in the groove 510 farthest away from the card. This position is illustrated as 551A in FIG. 13. When the clamp carriage 230 is in the staging position or in the receiving position, the pin is situated at a position 551B' or 551B respectively, as illustrated by FIGS. 12 and 13.

FIGS. 15A and 15B illustrates the clamping mechanism in detail. The top plate 241 is attached to a top plate strip 570 along the edge of top plate that is above the clamp carriage 230. The top plate strip is secured to the top plate 241 through the use of top plate screws 560 as illustrated in FIGS. 13, 15A, and 15B. The bottom plate 242 is attached to the clamp carriage 230 through the use of bottom plate screws 561. The bottom plate extends beyond the clamping region 562 (FIG. 15 B) to cover an air chamber 580 formed in or bored into the clamp carriage 230. The air chamber 580 in the clamp carriage is a recessed portion in the clamp carriage 230 which contains a clamp piston 530. The bottom plate 242 covers an open top of the chamber 580. The clamp piston moves up and down in the air chamber 580 and is sealed to the air chamber sidewall by a seal ring 581, carried in a groove on the piston 530. The piston 530 is connected to the top plate strip 570 by a fastener 531 and a surrounding tubular spacer 532. The fastener 531 is threaded into a threaded hole in the top of the piston 530 and when drawn tight, clamps the tubular spacer between the strip 570 and the piston 530. The tubular spacer 532 slides within an annular air seal 533 carried by the bottom plate 242.

Two air nozzles 540a, 540b are connected to bottom plate 242, and serve as alternate air inlet and outlet nozzles for the air chamber. The clamp piston moves upward as a result of pressurized air input into the nozzle 540b, with nozzle 540a acting as an air bleed, and moves downward to clamp a card as a result of pressurized air input into the nozzle 540a, with nozzle 540b acting as an air bleed. The nozzle 540a opens to a top side of the piston 530 within the chamber 580, and the nozzle 540b is open to a bottom side of the piston 530 within the air chamber 580, through a channel 540c. Two rod-shaped top clamp guides are attached to the top plate strip 570 on either side of the clamp piston 530. These clamp guides 520 are fitted through two channels 521 which span the entire depth of the clamp carriage 230. The clamp guides 520 assist in keeping the top plate from inadvertently pivoting around the clamp piston 530 or tilting from a true vertical movement.

Figure 8:
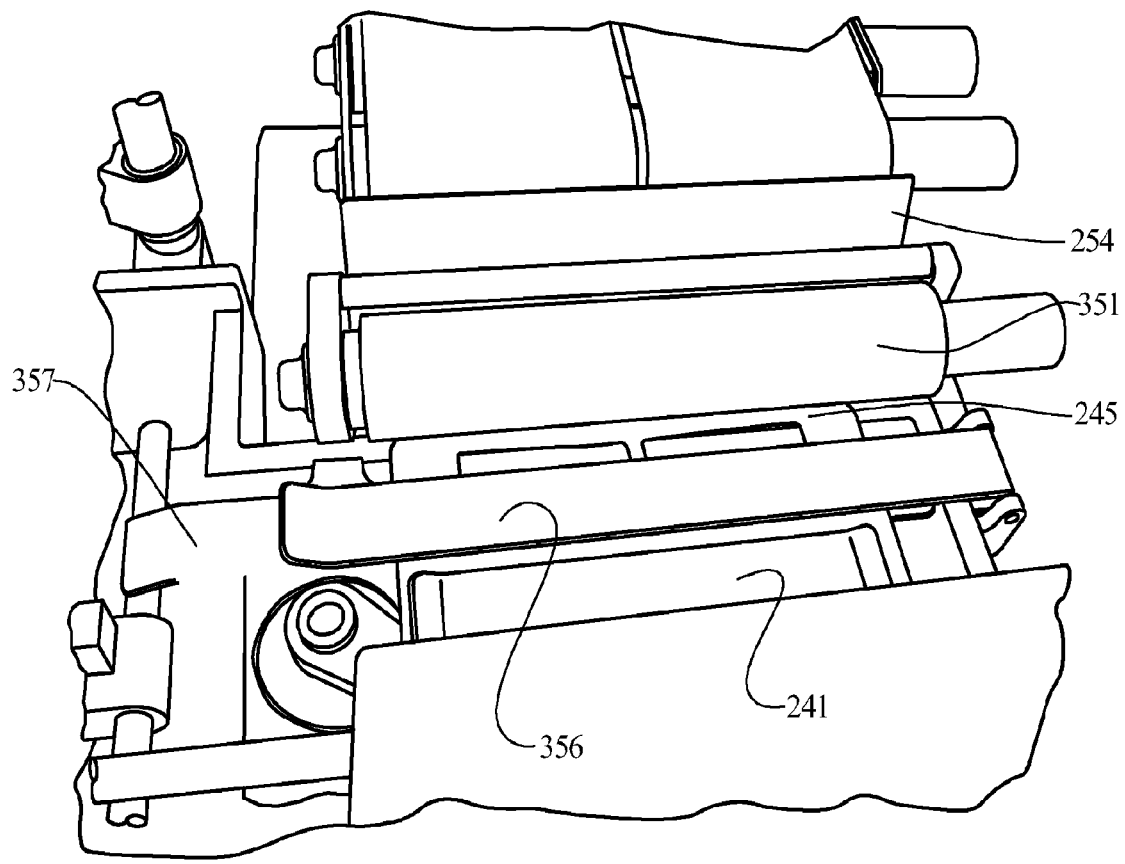
FIG. 8 illustrates a card in its staging position.
Figure 9:
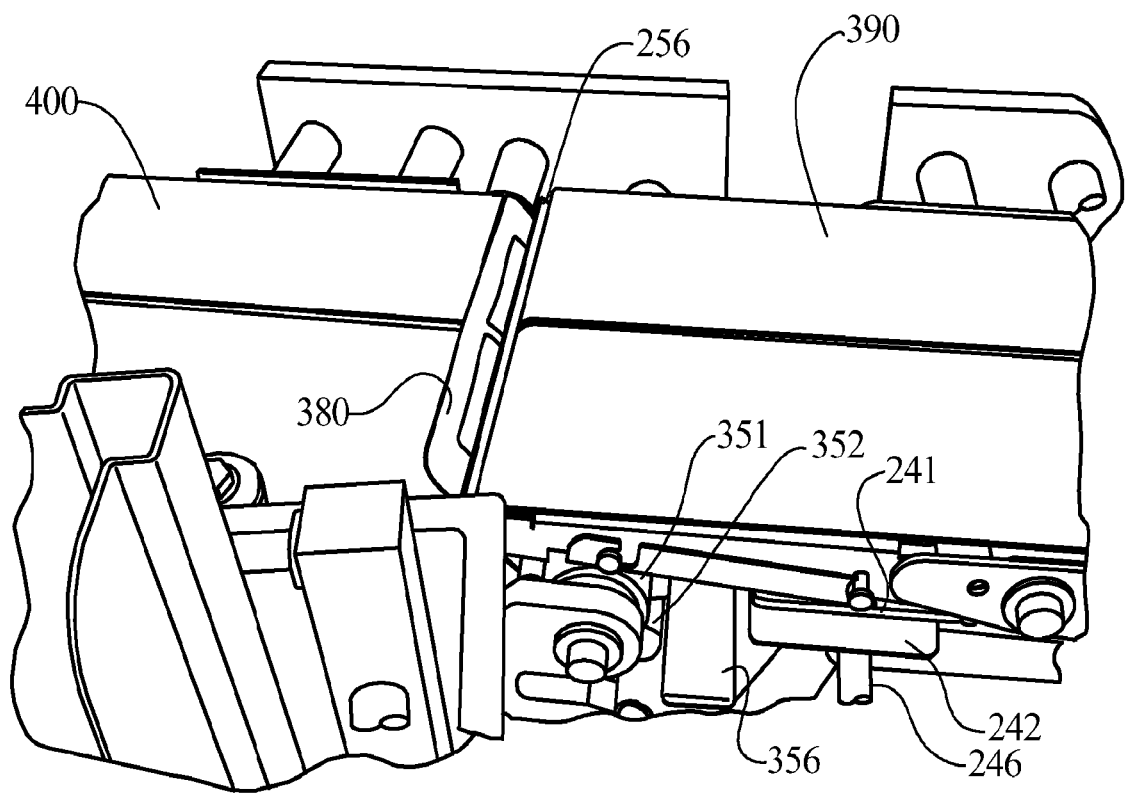
FIG. 9 illustrates a card being dispensed between two conveying surfaces.
Figure 10:
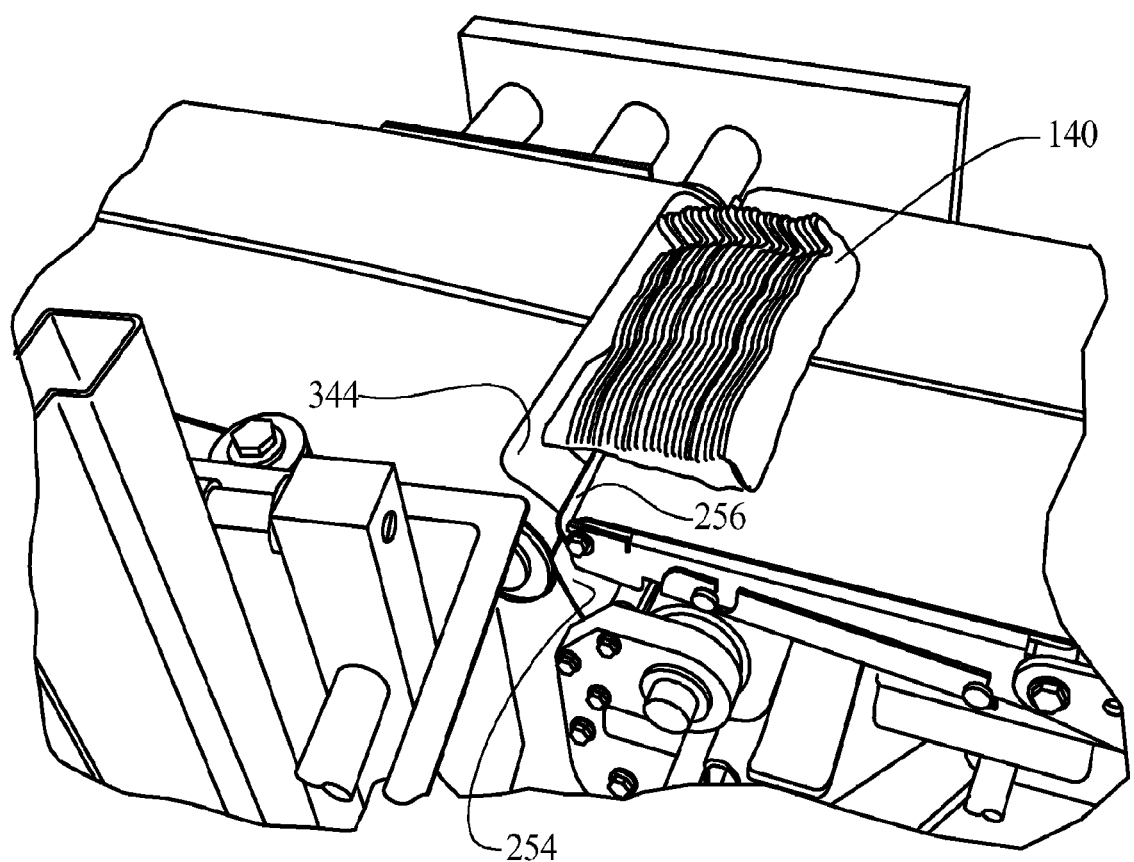
FIG. 10 illustrates bacon being disposed onto the card.

FIGS. 8 and 15 illustrate the card in its staging position, where the leading edges of the card are positioned in the card nip roller area 350. The card nip roller area 350 comprises a motorized drive roller 351 and an idler roller 352. Upon a grading signal, the dispensing mechanism activates, causing the card nip to close and grasp the card between the drive roller and the idler roller. To close the nip, a pneumatic cylinder actuator 353 presses the idler roller 352, by pivoting an idler roller- mounting lever, toward the drive roller 351, to pinch the card therebetween. The closing of the card nip is simultaneous with the card clamp releasing its hold on the card, thus allowing the card to roll up between adjacent conveying surfaces (FIG. 9), and to dispense beneath an oncoming draft (FIG. 10). Preferably, the drive roller 351 is made of rubber or other gripping surface.

As the card is fed through the rollers, it reaches a guide plate 254 (FIGS. 6 and 10) situated on the opposite side of the rollers. The guide plate 254 is inclined upwards and in the direction of travel A, of the product draft. The guide plate 254 assists in guiding the leading edge of the card upwards between adjacent conveying surfaces. A second guide plate 256 as illustrated in FIG. 10, can be used for additional guidance of the card. The dispensing of the card is synchronized with the movement of oncoming product draft such that the movement of the product draft along the conveying surface allows the product draft to be deposited on the card as it emerges from between the adjacent conveying surfaces. The product draft deposited on the dispensed card then continues down the conveying surface for further processing, such as packaging.

In operation, a product draft moves along the infeed conveyor and passes under the product grading station 100. The product grading station comprises a product sensor 120 which notes the position of the product draft 140 on the conveying surface so as to allow the product to be tracked as it moves along the conveying surface (FIG. 1). After the product draft passes the product sensor 120, it enters the photo area, designated as "B" in FIG. 1. In the photo area, a camera 110 captures a digital image of the product draft. The digital image of the product draft is transferred to a vision system software for analysis. The vision software, such as the one disclosed in U.S. Pat. No. 6,997,089, analyzes the captured image by comparing the lighter areas indicating fat, with the darker, lean areas of the product draft. A fat-to-lean ratio is determined, and compared with a operator programmed fat-to-lean parameter to determine under which grade the draft being analyzed should be categorized, for example, grade 1 or grade 2. In other embodiments, more than two different grades of draft product can be sorted and disposed on appropriate cards with labeling information corresponding to the grade of the draft, in accordance with the invention.

Once a grade is determined for a product draft, a signal is sent to the card assembly with the cards having labeling information corresponding to the grade of the particular draft, to activate the dispensing mechanism.

As the draft product moves along the conveying surface, the card assembly station(s) with cards that are inapplicable to the grade of the particular draft remains dormant and does not dispense a card between the conveying surface. The product draft by-passes the inapplicable card assembly station(s) without incident, and thus is only deposited on the appropriate card dispensed between the conveying surfaces at the card assembly station dispensing cards with the applicable grade information. For example, in a card dispensing system in accordance with the invention for dispensing two different cards with different grade information ("a two grade dispensing system"), the draft product can by-pass a dormant first assembly station, and be deposited on the card dispensed by the activated second assembly station. In a three grade dispensing system, the draft product can be deposited on a card dispensed by any one of the three card assembly stations that is activated to move the card from its staging position to being dispensed, while by-passing the other dormant card assembly stations with cards of inapplicable grades positioned in the staging station, waiting for the appropriate grade signal to activate their dispensing mechanism.

Figure 11:
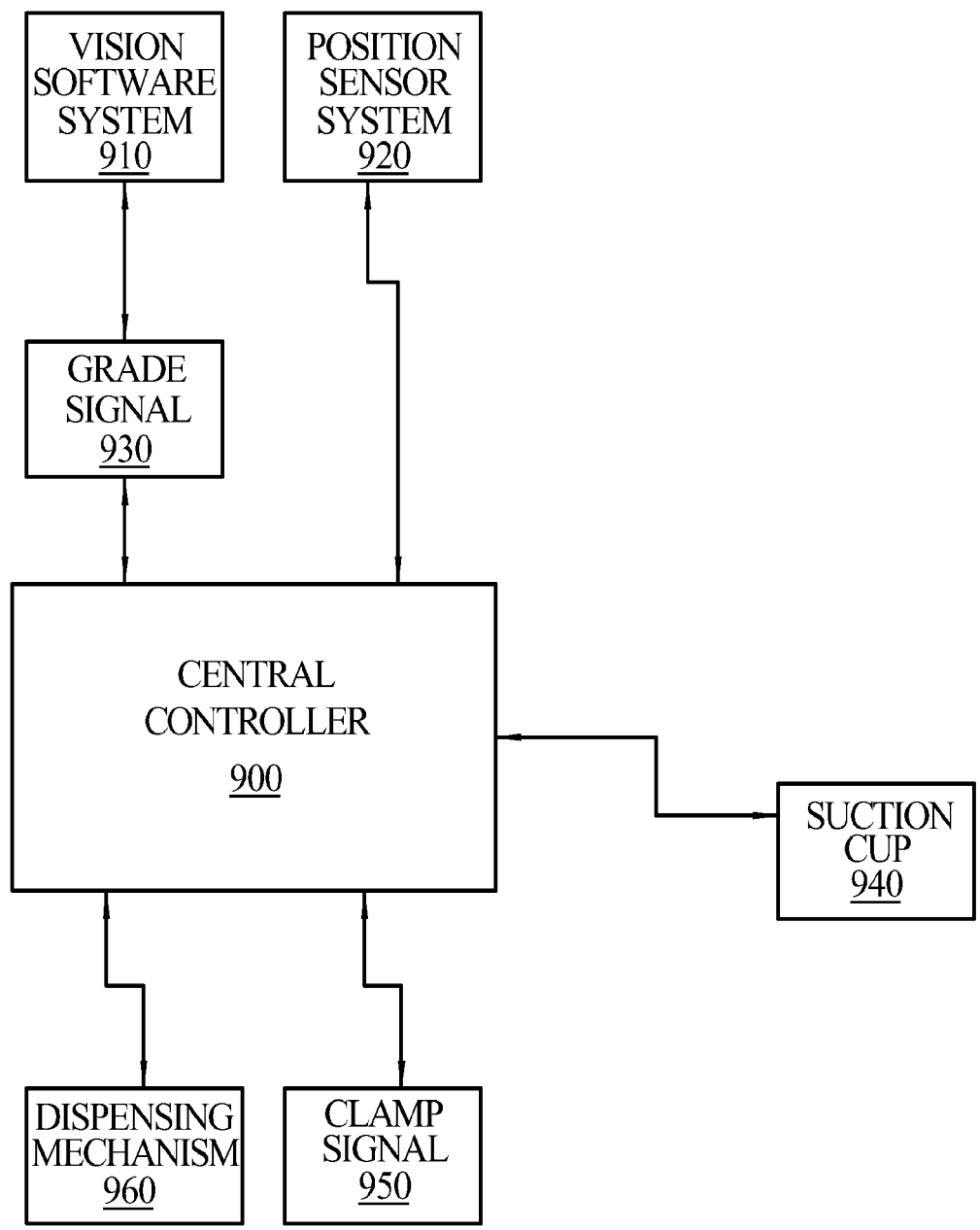
FIG. 11 is a schematic block diagram of one embodiment of a control system that may be used in the card dispensing apparatus.

FIG. 11 is a schematic block diagram of one embodiment of a control system that may be used with the card dispenser. FIG. 11 illustrates a central controller 900 which receives a signal from the position sensor system 920 used in conjunction with the product sensor 120. The central controller 900 also receives a grade signal 930 from the vision software system 910. Upon receiving the grade signal 930, the central controller 900 sends a signal to the appropriate dispensing mechanism 960 to activate it. The controller simultaneously activates the dispensing system 960 which causes the card nip to close, by the pneumatic actuator 353, and sends a clamp signal 950 to the card clamp 240 to release so the card can be dispensed. Once the card clamp 240 releases the card to the card nip, the card clamp is sent back to the receiving position to receive the next card. At a time before the card clamp 240 moves back to its receiving position, a signal 940 is sent to the suction cups to move up and pull down the next card in the hopper, so that the card is already awaiting the card claim 240 when it returns to its sliding position. Once the clamp is in the receiving position, the central controller 900 sends a signal to close the clamp around the card, and simultaneously triggers a release of the suction force. The card clamp proceeds towards the staging position, and waits for the next activation signal of the dispensing mechanism.

From the foregoing, it will be observed that numerous variations and modifications may be effected without departing from the spirit and scope of the invention. It is to be understood that no limitation with respect to the specific apparatus illustrated herein is intended or should be inferred.

All references, including publications, patent applications, and patents, cited herein are hereby incorporated by reference to the same extent as if each reference were individually and specifically indicated to be incorporated by reference and were set forth in its entirety herein.

The invention claimed is:

1. A card dispensing system for use with a conveying surface which conveys sliced products in a conveying direction along the conveying surface downstream of a slicing machine to package the sliced products with the card, comprising:
   a hopper for containing a plurality of vertically stacked cards supported within the hopper by support fingers which releaseably hold the cards;
   a mechanism disposed beneath the hopper for withdrawing the bottom card from the hopper past the support fingers and moving the bottom card into a receiving position;
   a card transportation mechanism located below the conveying surface which receives the card at the receiving position and transfers the card to a staging position;
   a delivery mechanism located below the conveying surface and adjacent to the card when the card is in its staging position, the delivery mechanism feeds the card from its staging position towards a junction in the conveying surface as sliced product passes over the junction;
   wherein the card transportation mechanism comprises a card clamp with a top plate and a bottom plate each connected to a clamp carriage moveable along clamp carriage guide arms in a lateral direction relative to the conveying direction.

2. The card dispensing system of claim 1 wherein the mechanism for withdrawing the bottom card from the hopper utilizes at least one suction cup to withdraw the bottom card, and wherein a clamping of the card by the top and bottom plate causes the at least one suction cup to release the card.

3. The card dispensing system of claim 1 wherein movement of the clamp carriage along clamp carriage guide arms is effectuated by rotational movement of a clamp carriage drive arm rotatable about a shaft; said clamp carriage connected to the clamp carriage drive arm.

4. The card dispensing system of claim 3 wherein the rotational movement of the clamp carriage drive arm is converted to linear movement of the clamp carriage along the clamp carriage guide arms via a slider link mechanism.

5. A method of dispensing a card from a storage area to a junction between two conveying surfaces along a food processing conveyor line such that food product batches being conveyed in a conveying direction along the food processing conveyor line are disposed on the card at the junction, comprising the steps of:
   withdrawing a bottom card from a hopper containing a stack of cards;

moving the card to a receiving position;

clamping the card between a top plate and a bottom plate connected to a clamp carriage;

moving the clamp carriage along clamp carriage guide arms in a lateral direction relative to the conveying direction to transport the card to a staging position; and dispensing the card from the staging position to a position along the conveyor line through the junction.

6. The method of claim 5 wherein the step of withdrawing a card from a hopper further comprises the step of applying a suction force to the bottom card in the hopper using at least one suction cup connected to a source of suction force.

7. The method of claim 6 further comprising the steps of:
moving the source of suction force upwards towards the bottom card;
and moving the source of suction force downwards to move the bottom card away from the hopper.

8. The method of claim 5 wherein the step of moving the card to a receiving position comprises a lateral movement of the card.

9. The method of claim 5 wherein the step of moving the clamp carriage along clamp carriage guide arms comprises converting rotational movement of a clamp carriage drive arm to which the clamp carriage is connected, to linear movement.

10. The method of claim 9 wherein the step of converting rotational movement of the clamp carriage drive arm to linear movement comprises the step of engaging the clamp carriage drive arm with a slider link mechanism.

11. The method of claim 5 wherein the step of dispensing the card from the staging position comprises the step of feeding the card through a nip.

12. The method of claim 11 wherein the step of feeding the card through the nip is timed to coincide with the timing of food product batch as it passes the junction.

13. The method of claim 5 wherein the step of transporting the card to a staging position further comprises the step of increasingly engaging the card with a guiding strip disposed beneath the junction.

14. A card dispensing system for use with a conveying surface which conveys sliced products in a conveying direction along the conveying surface downstream of a slicing machine to package the sliced products with the card, comprising:

a hopper positioned to a side of the conveying surface for containing a plurality of vertically stacked cards supported within the hopper by support fingers which releaseably hold the cards;

a mechanism disposed beneath the hopper for withdrawing the bottom card from the hopper past the support fingers and moving the bottom card into a receiving position;

a card transportation mechanism moveable in a lateral direction relative to the conveying direction between the receiving position, in which the card transportation mechanism is located to the side of the conveying surface, and a staging position, in which the card transportation mechanism is located below the conveying surface, wherein the card transportation mechanism is configured to receive the card at the receiving position and transfer the card to the staging position; and a delivery mechanism located below the conveying surface and adjacent to the card when the card is in the staging position, the delivery mechanism feeds the card from the staging position towards a junction in the conveying surface as sliced product passes over the junction.

15. The card dispensing system of claim 14 wherein the card transportation mechanism comprises a card clamp with a top plate and a bottom plate each connected to a clamp carriage moveable along clamp carriage guide arms in the lateral direction.

16. The card dispensing system of claim 15 wherein the mechanism for withdrawing the bottom card from the hopper utilizes at least one suction cup to withdraw the bottom card.

17. The card dispensing system of claim 16 wherein a clamping of the card by the top plate and the bottom plate causes the at least one suction cup to release the card.

18. The card dispensing system of claim 14 wherein movement of the clamp carriage along clamp carriage guide arms is effectuated by rotational movement of a clamp carriage drive arm rotatable about a shaft; said clamp carriage connected to the clamp carriage drive arm.

19. The card dispensing system of claim 18 wherein the rotational movement of the clamp carriage drive arm is converted to linear movement of the clamp carriage along the clamp carriage guide arms via a slider link mechanism.

* * * * *